Jan. 22, 1924.
W. J. MARTIN
SAFETY DEVICE
Filed May 3, 1918
1,481,299
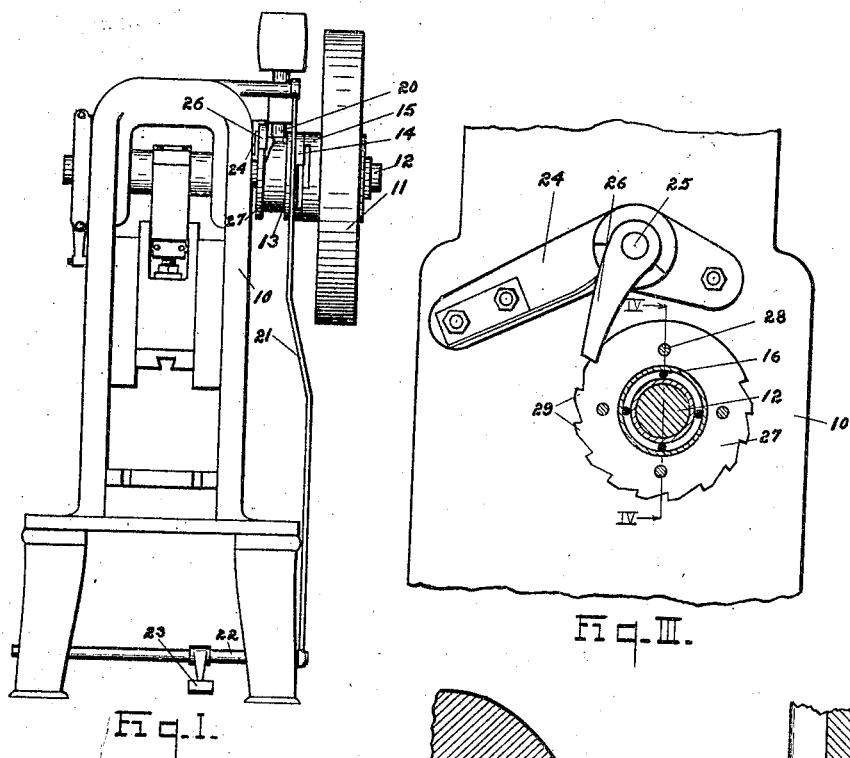
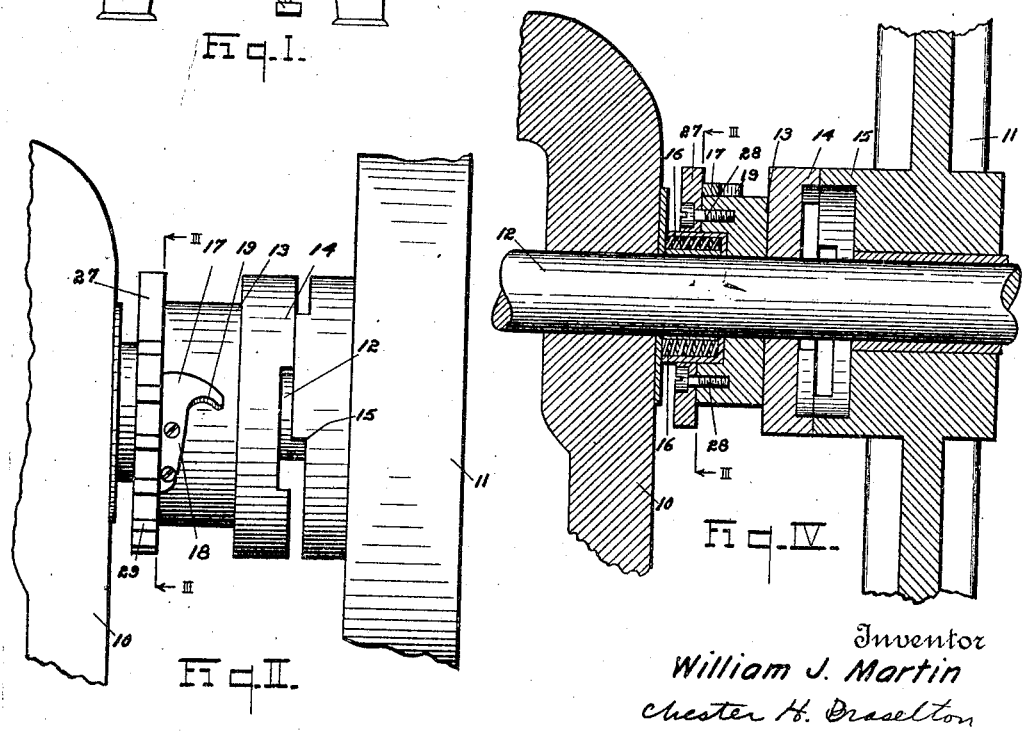
Inventor
William J. Martin
Chester H. Braselton
Attorney Patented Jan. 22, 1924.

1,481,299

UNITED STATES PATENT OFFICE.

WILLIAM J. MARTIN, OF TOLEDO, OHIO, ASSIGNOR TO THE WILLYS-OVERLAND COMPANY, OF TOLEDO, OHIO, A CORPORATION OF OHIO.

SAFETY DEVICE.

Application filed May 3, 1918. Serial No. 232,236.

*To all whom it may concern:*

Be it known that I, WILLIAM J. MARTIN, a citizen of Canada, and a subject of the King of Great Britain and Ireland, residing at Toledo, in the county of Lucas and State of Ohio, have invented certain new and useful Improvements in Safety Devices, of which I declare the following to be a full, clear, and exact description.

This invention relates to improvements in safety devices for use in connection with punch presses, trip hammers, and similar machines.

The principal object of this invention is to provide improved safety devices which may be used in connection with punch presses or devices having similar operating mechanism, the construction of the safety devices being such as to positively stop movement of the operating parts and to prevent a reverse movement of the operating parts such as is likely to occur, and, taking the operator unawares, catch his fingers between the dies.

Further objects, and objects relating to economies of manufacture and details of construction, will definitely appear from the detailed description to follow.

I accomplish the objects of my invention by the devices and means described in the following specifications. My invention is clearly defined and pointed out in the appended claim.

A structure constituting a preferred embodiment of my invention is illustrated in the accompanying drawing, forming a part of this specification, in which:

Fig. I is a view in front elevation of a punch press equipped with a safety device constructed in accordance with my invention.

Fig. II is a fragmentary, top plan view of the clutch mechanism of the punch press.

Fig. III is a detail, sectional view taken substantially on the line III—III of Figs. II and IV, and Fig. IV is a fragmentary, detail, sectional view, taken substantially on the line IV—IV of Fig. III.

In the drawings, similar reference numerals refer to similar parts throughout the several views, and the sectional views are taken looking in the direction of the little arrows at the ends of the section lines.

Considering the numbered parts of the drawing, I have shown a punch press comprising the frame 10 and the main shaft 12 on which the fly wheel or driving pulley 11 is loosely mounted. The clutch 13 is slidably but non-rotatably mounted on the main shaft 12 and provided with teeth or jaws 14 which are adapted to interlock with the jaws 15 mounted on the hub of the fly-wheel 11. Springs 16 are housed within the clutch member 13 and adapted to press said clutch member laterally on the main shaft 12 so as to bring the jaws 14 and 15 into interlocking engagement, so that the main shaft 12 is driven from the fly-wheel 11. The plate 17 is mounted on the hub of the clutch member 13, said plate having an inclined portion 18 terminating in a notch or recess 19. A plunger 20 is mounted in a suitable bearing in the frame 10 and carries a weight at its upper end which normally tends to bring the end of the plunger 20 into contact with the hub of the clutch member 13, so that the end of the plunger engages the inclined portion 18 and the recess 19 of the bracket 17. In the normal operation of the clutch member 13 and the main shaft 12, turning of the clutch member 13 brings the part 18 into contact with the plunger 20 and the inclination of the part 18 moves the clutch member 13 laterally to one side to bring the jaws 14 and 15 out of interlocking engagement.

The clutch member 13 and therefore the main shaft 12 is held against forward movement by the engagement of the plunger 20 in the notch 19. No means is provided in the usual construction which would prevent a reverse or backward rotation of the shaft 12, and it sometimes happens that the shaft 12 has not moved completely past the top dead center when the rotation of the shaft is stopped, and hence, the weight of the dies and other parts tends to rotate the shaft 12 backward, allowing the die to come down and crush the fingers of the operator. The plunger 20 is operated by means of the rod 21 connected to the rock shaft 22 and on which is mounted the operating lever 23. In order to prevent inadvertent backward or reverse rotation of the main shaft 12, such as is extremely likely to result in catching and crushing the fingers of the operator, I provide a ratchet disc 27 which is fastened to the end of the clutch member 13 by means of the bolts 28. A bracket 24 is mounted on the frame 10 and carries a pin 25 on which the pawl 26 is pivoted, this pawl 26 having its end in engagement with teeth 29 formed in the periphery of the disc 27. The direction of the pawl 26 and of the teeth 29 is such that they do not interfere with the forward rotation of the main shaft 12 and the clutch member 13, but will engage and interlock to prevent any reverse rotation of these parts. The pawl 26 is sufficiently wide to remain in engagement with the ratchet when the latter is shifted with the clutch 13.

From the description of the parts given above, the operation of this device can be very readily understood. It is obvious that the member 17 through its co-action with the plunger 20 positively disconnects the clutch and positively arrests forward movement of the shaft 12. It will also be observed that, by means of the pawl and ratchet disc, the pawl being connected to the frame while the ratchet disc is connected to the clutch member rotating with the main shaft, I have provided means whereby a reverse rotation of the main shaft is prevented, while these means do not in any respect interfere with the forward rotation of the shaft in the usual manner. By these simple and effective means, I have eliminated one of the most dangerous sources of injury to workmen employed on punch presses, or similar machines, as the main shaft, having once been stopped, it is absolutely impossible for it to rotate backward or turn once more until released by the depression of the lever 23 which is under the control of the workman.

I am aware that the particular embodiment of my invention, which I have here shown and described, is susceptible of considerable variation without departing from the spirit thereof, and therefore, I desire to claim my invention broadly, as well as specifically, as indicated by the appended claim.

Having thus described my invention, what I claim as new and desire to secure by Letters Patent, is:

In a machine of the class described, a horizontal shaft, a drive wheel loosely mounted upon the shaft, said drive wheel being provided with a clutch face, a clutch splined to said shaft for movement into and out of engagement with the said drive wheel clutch face, a cam on said clutch, a plunger movable into engagement with said cam to shift the clutch out of engagement with the drive wheel, automatic means for preventing further forward rotation of the clutch after its disengagement with the drive wheel and means for preventing the reverse rotation of the clutch at all times, comprising a ratchet wheel rigidly mounted upon the clutch and a pawl mounted upon a rigid portion of the machine, the lateral proportions of the pawl and ratchet being such as to cause those parts to co-operate during all positions of the clutch.

In testimony whereof, I affix my signature.

WILLIAM J. MARTIN.